April 11, 1961 — C. W. KANDLE — 2,979,143
VERTICAL DRILL SYSTEM FOR INSTALLING PIPE
Filed May 29, 1958 — 2 Sheets-Sheet 1

INVENTOR.
CHARLES W. KANDLE
BY
Andrus & Starke
Attorneys

April 11, 1961 C. W. KANDLE 2,979,143
VERTICAL DRILL SYSTEM FOR INSTALLING PIPE
Filed May 29, 1958 2 Sheets-Sheet 2
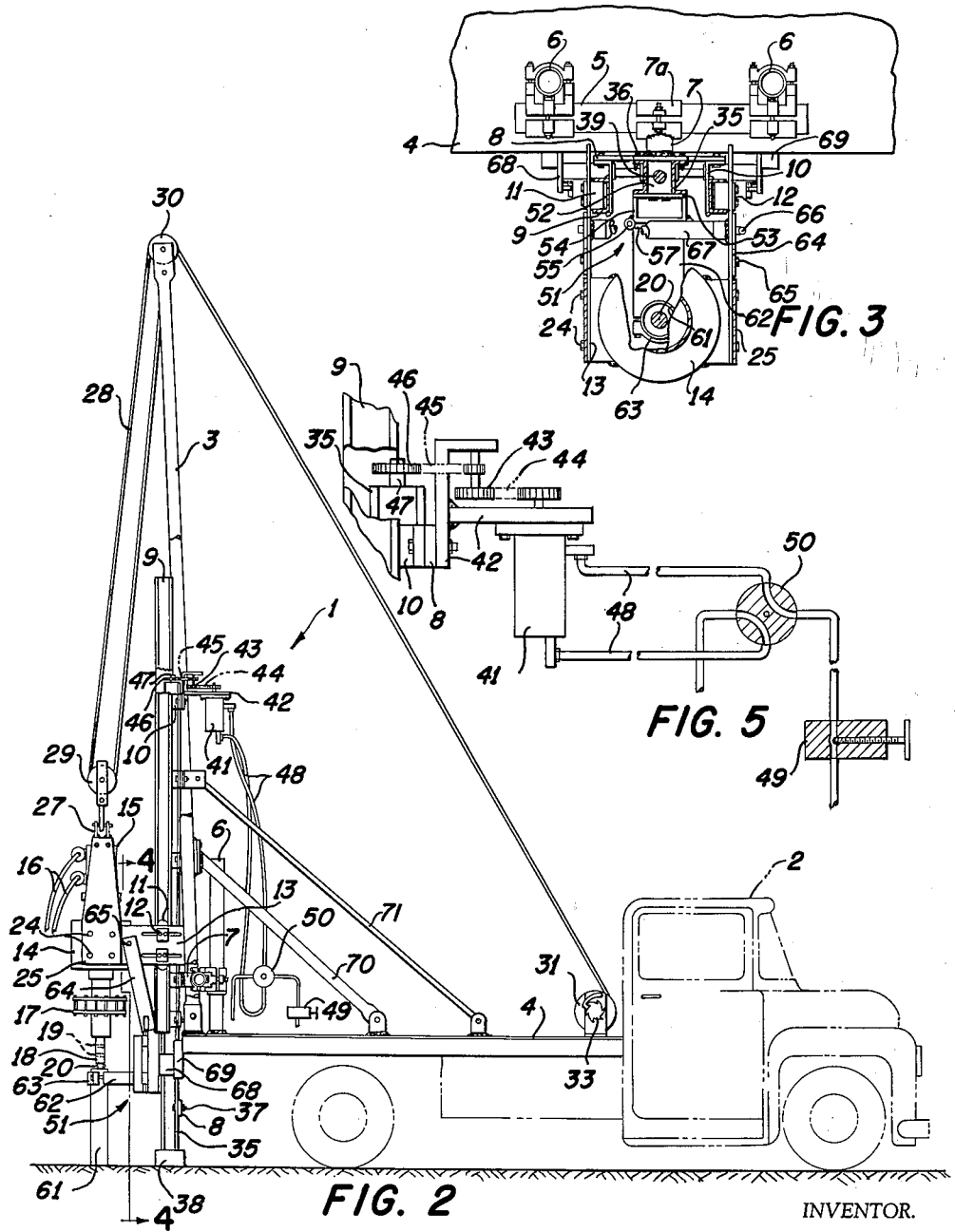
INVENTOR.
CHARLES W. KANDLE
BY
Andrus & Starke
Attorneys

United States Patent Office 2,979,143
Patented Apr. 11, 1961

2,979,143

VERTICAL DRILL SYSTEM FOR INSTALLING PIPE

Charles W. Kandle, La Grange Park, Ill.
(1845 S. 55th Ave., Cicero, Ill.)

Filed May 29, 1958, Ser. No. 738,772

5 Claims. (Cl. 175—130)

This invention relates to a vertical drill system for installing pipe, and more particularly to a mobile drill rig and method utilizing a combination of gravity and power feeds. The method and apparatus are particularly adapted for cutting a neat hole into earth topped with pavement, and for simultaneously installing pipe in the hole.

When a relatively large vertical hole is to be bored for purposes of pipe connection or the like, the drilling must sometimes be made through cement, or asphalt pavement. This has previously necessitated breaking up of the pavement with an air hammer prior to drilling, since known drills adapted for this purpose have been of the gravity feed type and have been incapable of penetrating hard surfacing. The use of air hammers has not been entirely satisfactory, since a large area of pavement surrounding the bore has usually been destroyed by the vibrating action thereof, causing needless repair expense and an unsightly surface.

In addition, pipe installation in a vertical bore has previously been made after the hole is drilled and the rig removed, resulting in additional consumption of time after drilling.

The present invention solves the above-mentioned problems and provides an efficient and highly mobile apparatus capable of drilling to great depths. The apparatus combines a power feed and gravity feed for the same drill, whereby the former feed is selectively actuated to bore a clean hole through pavement and the latter feed is selectively engaged for subsequent boring into the earth beneath. The pipe to be installed is mounted to surround the upper portion of the drill shaft and travels with the drill for simultaneous installation.

The accompanying drawings illustrate the best mode presently contemplated by the inventor for carrying out the invention.

In the drawings:

Fig. 2 is a side elevation of the apparatus, showing it mounted on a truck for mobility, and viewed from the right of Fig. 1;

Fig. 3 is a horizontal section of the apparatus taken on line 3—3 of Fig. 1;

Fig. 5 is an enlarged view of the screw feed drive mechanism and showing the hydraulic controls.

Figures 1, 4:
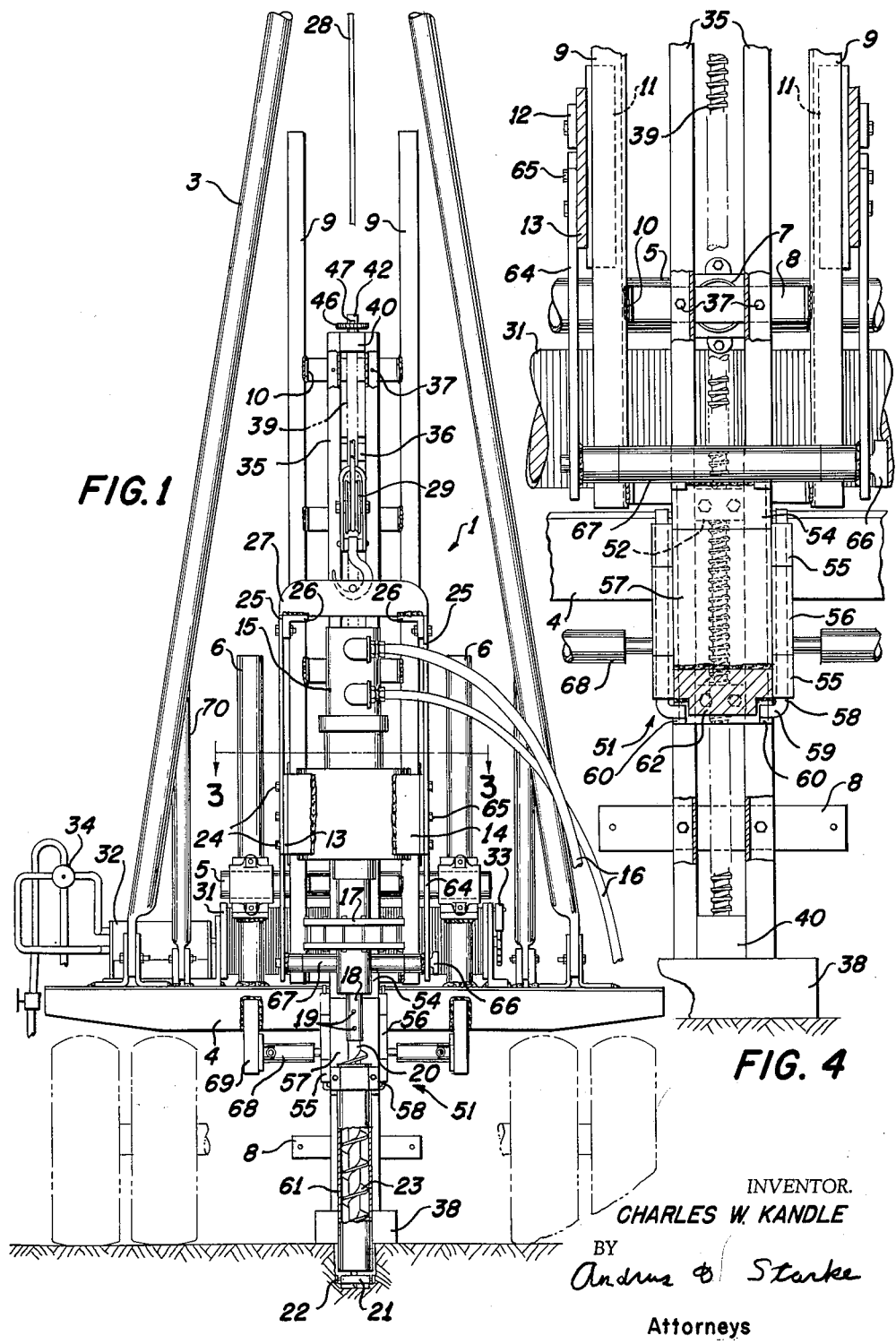
Figure 1 is a rear elevation of a drilling apparatus constructed in accordance with the invention.
Fig. 4 is a vertical section of the apparatus taken on line 4—4 of Fig. 2, with some parts removed for clarity.

As shown in the drawings, the drill unit 1 is mounted for mobility on a truck 2 or the like and is adjustable from a horizontal to a vertical or working position by a suitable boom 3 mounted on the platform 4 of the truck. Pivotal support for the drill unit 1 is provided by a horizontally disposed large pivot pipe 5 which is clamped to a pair of spaced upstanding tubular members 6 disposed adjacent the rear end portion of platform 4. An arm 7 is mounted, as by bracket 7a, for pivotal movement on pivot pipe 5 and extends rearwardly therefrom for supporting connection to one of a plurality of cross braces 8 which extend between a pair of spaced relatively heavy channel irons 9. A rearwardly extending bracket 10 is mounted on each end of each cross brace 8, and the plurality of brackets 10 so utilized secures channel irons 9 so they are spaced rearwardly from the braces.

Channel irons 9 form the main frame structure of the drill unit and are disposed vertically with the lower ends terminating adjacent platform 4 when the unit is in drilling position. Irons 9 are shown as being in back-to-back spaced relationship with the flanges thereof facing outwardly. The flanges of each iron 9 provide a track or guide channel for receiving an elongated guide plate 11 slidingly disposed therein.

Each guide plate 11 has suitable upper and lower pairs of holes therein for threadably receiving double-bolt clamps 12 adapted to adjustably secure a rearwardly extending slotted plate 13. The rear end portions of plates 13 are rigidly secured to opposite sides of the transmission housing 14 for a drill motor 15 mounted thereabove and rotatably connected thereto. Motor 15 may be of any suitable type, that shown being pneumatic and supplied from an air source through hoses 16.

The rotatable output shaft of the transmission extends downwardly therefrom and is connected through a slip clutch 17 to a hollow drill holder 18. Holder 18 is adapted to receive and secure by pin members 19 the upper end of a drill shaft 20, the latter having a suitable cutter drill 21 and wing cutters 22 on its lower end and having spiral convolutions 23 on its surface to form an auger-like member.

The bolts 24 which connect plates 13 to housing 14 also secure the lower ends of a pair of upwardly extending arms 25, the upper ends of which are connected by brackets 26 to the opposite ends of cross-braces 27. Arms 25 and braces 27 form a frame which partially surrounds and rigidly supports motor 15 and its related drive components for sliding movement on channel irons 9.

Gravity feed of the drill is provided by a cable 28 which passes under and upwardly from a pulley 29 secured as by a hook to brace 27. Cable 28 extends to the top of boom 3, with one end secured to the boom and the other portion passing over a pulley 30 and extending downwardly to a winch 31 mounted at the front of platform 4. Winch 31 is rotatably controlled to raise and lower the drill frame by a hoist motor 32 of pneumatic or other type, and if desired by a suitable ratchet 33 and gears, not shown.

Turning of winch 31 in one direction will reel in cable 28, thus hoisting the drill unit on channels 9. If motor 32 is released, drill unit 1 will be under the complete influence of gravity and will travel downward on channels 9 at a rate depending on the rate drill head 21 can bore into the earth. If desired, motor 32 can be actuated by a suitable valve 34 to apply a braking force to the downward movement of the drill to limit boring speed to a predetermined desired amount.

When the apparatus is to drill a vertical bore in soft earth, gravity feed is sufficient. However, the weight of the drill unit is usually insufficient to cause penetration of a hard surface, such as a sidewalk, especially when a 16 to 19 inch diameter bore is to be made. To eliminate the need for air hammers, and to penetrate the hard surface while leaving the surrounding portion thereof intact, the apparatus is provided with a power feed mechanism.

As shown in the drawings, this mechanism comprises a pair of vertically extending spaced channels 35 having facing flanges and disposed between channel irons 9.

Channels 35 are rigidly connected by a plurality of vertically spaced cross-braces 36, and are mounted on braces 8 by means of bolts 37. This construction disposes channels 35 slightly forwardly of channel irons 9, as best seen in Fig. 3. The top ends of channels 35 terminate below the top ends of channel irons 9, while the lower ends of channels 35 extend a substantial distance below platform 4 and may be supported adjacent the ground by blocks 38 or the like.

A longitudinally extending feed screw 39 extends between channels 35 and is protected thereby, and is mounted for rotation in suitable bearing blocks 40 secured between the end portions of the channels. The motive force for screw 39 is provided by a hydraulic motor 41 secured to a bracket 42 which in turn is mounted on the forward face of the uppermost cross-brace 8 of channel irons 9, closely adjacent the upper ends of channels 35. Connection between motor 41 and screw 39 is made by a suitable chain and sprocket arrangement, that shown including an intermediate sprocket 43 between a motor chain 44 and a feed screw chain 45. The latter chain is mounted on a sprocket 46 keyed or otherwise secured to an extension 47 of screw 39.

Motor 41 is supplied with hydraulic fluid through hoses 48 from a suitable fluid source, not shown. It is desirable that motor 41 be selectively reversible and selectively driven at a plurality of speeds within a given range. To this end, a speed control valve 49 is connected in the hose 48 supplying the motor. In addition, a cross-over reversing valve 50 is connected to both hoses 48 between motor 41 and valve 49.

A pipe clamp saddle assembly 51 is mounted for vertical movement on feed screw 39 by a plurality of threaded nuts 52 which are bolted to the outer face of a base plate 53 of the assembly and threadably receive the screw. Plate 53 rides on the rear flanges of channels 35 and has a box-like support 54 fixedly mounted thereon. As best seen in Fig. 4 a pair of vertically spaced pin bearings 55 are disposed adjacent each vertical edge on the rear face of box 54 and may be welded or otherwise secured thereto.

Bearings 55 are spaced sufficiently to permit the insertion of similar pin bearings 56 therebetween, the latter being secured adjacent the vertical edges of a removable pipe clamp plate 57. The respective bearings 55 and 56 are adapted to be disposed in axial alignment whereby locking pins 58 may be passed therethrough to lock plate 57 to the rear surface of box 54. One end of each pin 58 is bent at an approximate right angle, indicated by numeral 59, and the lower corner portion of the rear surface of box 54 are flanged rearwardly therefrom at 60 so that after locking the plate to the box, the pins may be rotated to dispose the portion 59 parallel to plate 57 and in engagement with the respective flange 60. This assures retention of the pins within their bearings. In addition, the lower rear corner portions of plate 57 are notched to receive bent portions 59 of the pins.

Clamp assembly 51 is adapted to vertically secure a pipe 61 for installation in the ground, and to this end a large jaw 62 is welded or otherwise secured to the rear face of plate 57, with the base line of the jaw being vertical to provide a nesting support for the upper end of the pipe. To hold the pipe to jaw 62 and prevent slippage thereof, a jaw clamp 63 is mounted on the outer circumferential surface of pipe 61 and is bolted to jaw 62 whereby the pipe is tightened between the jaw and clamp.

Other suitable types of clamping arrangements may be utilized without departing from the spirit of the invention.

It can thus be seen that actuation of feed screw 39 will cause assembly 51 and its clamped pipe 61 to be selectively raised or lowered under power.

The arrangement described contemplates that pipe 61 will concentrically surround or envelop drill shaft 20 and be coextensive therewith with spiral 23 approaching the inside diameter of the pipe. In the event that pipe 61 and shaft 20 are not in axial alignment, as when the size of pipe is changed, slotted plate 13 may be adjusted laterally relative to channels 9 and 35 to produce the necessary alignment.

Power feed of the drill is provided by a pair of vertically extending power transfer supports 64. The upper end of each support is secured, as by a single bolt 65, for swinging pivotal movement on slotted plate 13 adjacent the forward edge of the respective arm 25. The lower end portion of each support 64 has an opening therein to receive a locking pin 66 which passes through both openings and is supported centrally by a segmental elongated pin bearing 67 mounted on the upper end portion of box 54. The central portion of bearing 67 can be removed from the end portions thereof when pin 66 is removed. Supports 64 provide a link in the power connection between motor 41 and the drill.

The length of supports 64 is such as to dispose the upper end of pipe 61 closely adjacent the upper end of drill shaft 20 when locking pin 66 is disposed in bearing 67. Upper pivotal mounting of power supports 64 permits proper positive locking of drill motor 15 to feed screw 39, regardless of the adjusted position of slotted plates 13.

If desired, a pair of suitable jacks 68 may be disposed between channels 35 and flanges 69 which depend downwardly from the rear of platform 4 to rigidly secure the apparatus in a vertical position.

In operation, the apparatus is placed above the area where the pipe is to be installed. First, winch 31 is utilized to raise motor 15 to adjacent the upper ends of channel irons 9. Pipe clamp assembly 51 is then raised by feed screw 39 to adjacent the upper ends of channels 35, but below motor 15. The two units are then locked together by supports 64. Drill shaft 20 is then installed within pipe 61 and the assembly raised to a vertical position. Shaft 20 is secured for rotation by motor 15 and pipe 61 clamped to assembly 51.

Winch 31 is then released and feed screw motor 41 is actuated to feed the drill and pipe together simultaneously and at the same rate in a downwardly direction. Due to the power feed, drill head 21 and wing cutters 22 will bore through and penetrate any hard pavement at the surface, with pipe 61 following directly into the hole. It has been found that an exceedingly neat bore is thereby provided, with no destruction of surrounding pavement.

Channels 9 will restrain any tendency of motor 15 to turn due to the torque of the drill.

Once drill head 21 enters softer earth beneath the pavement, a faster feed than that afforded by screw 39 may be desired. This is accomplished by removing pin 66 to free the drill from the power feed, and simultaneously controlling winch 31 as desired. Continued feed of the drill will be under the influence of gravity, as governed by winch motor 32. Although, the drill and pipe 61 will no longer be fixed relative to each other, clamp assembly may be lowered at the desired speed by manually controlling valve 49. If the rate of gravity feed of drill shaft 20 varies due to differences in hardness of earth strata, value 49 can be controlled to provide an equivalent rate of pipe feed.

As boring is accomplished, the spoil from drill cutter 21 will be fed upwardly within pipe 61 by spiral 23, and will be discharged at the upper end onto a suitable conveyor, not shown.

When drilling is completed, the upper end of pipe 61 is unclamped from assembly 51, and winch 30 actuated to pull the drill upwardly, leaving the pipe installed in the hole.

Boom members 3 are held in vertical position by a pair of supports 70, while rails 9 are held in position by a pair of supports 71. When it is desired to lower the apparatus onto the truck for hauling purposes, pin 66 is inserted through bearing 67, and feed screw motor 41 is actuated to raise the drill unit to adjacent its uppermost position. Winch 31 is then actuated to pull cable 28 tight. Supports 71 are then separated at their upper ends from rails 7. By loosening cable 28 gradually, rails 9 and the drill unit will pivot downwardly on pipe 5. The upper ends of supports 70 are then released from boom members 3, and the latter can be manually lowered onto the truck.

The method and apparatus of the invention provides a novel combination of power and gravity feed for a single drill. Switching from one feed to another with the apparatus is quickly accomplished. The pipe to be installed travels downwardly directly behind the drill and provides the means through which the spoil is removed from the hole. During power feed, the pipe and drill maintain a given fixed relationship, and during gravity feed the said relationship is manually controllable.

Preparation of hard pavement prior to drilling is no longer necessary, thus eliminating unnecessary destruction thereof, and leaving the surrounding area intact.

Various methods of carrying out the invention are contemplated as being within the scope of the various claims distinctly claiming and particularly pointing out the subject matter regarded as the invention:

I claim:

1. An apparatus for drilling a relatively large vertical bore through pavement and the like and subsequently into the earth and for installing pipe therein, comprising a long rotary drill having cutting means at its lower end and having spiral convolutions extending upwardly from said cutting means, a motor unit connected to the upper end of said drill for rotatably driving the same to effect boring operations, vertically disposed track means securing said motor unit for movement thereon, a vertically movable member disposed between said track means and supported for vertical movement therebetween, clamping means securing the upper end of a pipe to said member whereby said pipe concentrically surrounds said drill, a second motor, mechanical power means driven by said second motor to selectively raise and lower said member and associated pipe independently of and relative to said drill, means to selectively connect or disconnect said member and said motor unit whereby said drill and pipe may be simultaneously fed downwardly by said mechanical power means to bore through relatively hard surface material incapable of being penetrated by gravity feed when said member and said motor unit are connected, and a hoist connected to said motor unit to selectively provide controlled gravity feed of the latter when said member and said motor unit are disconnected whereby said drill is fed downwardly by gravity when relatively softer material is being penetrated beneath the hard surface material.

2. The apparatus of claim 1 including means to permit adjustment of said motor unit laterally in relation to said track means to assure a concentric relationship between said drill and pipe.

3. The apparatus of claim 1 including a variable speed control for said second motor to provide relative feeding of said pipe downwardly independently of said drill at a rate commensurate with the gravity feed rate of the latter.

4. An apparatus for drilling a relatively large vertical bore in the earth and for installing pipe therein, comprising a pair of vertically disposed channel tracks, a motor unit adjustably mounted for sliding vertical movement on said tracks, an elongated drill rotatably secured to said motor unit and having cutting means at one end and spiral convolutions along its body extending upwardly from the cutting means, a pair of vertically disposed channel members disposed between said tracks, a feed screw mounted between said channel members, a saddle threadably secured to said feed screw for sliding movement along said channel members, releasable connector means extending between said motor unit and said saddle, a clamp plate secured to said saddle for clamping the upper end of a pipe in fixed relation with said drill and with the pipe enveloping the drill, motor means disposed at one end of the said channel members and connected to said feed screw to rotate the latter and thereby simultaneously feed said drill and pipe downwardly in fixed relationship and under power to provide penetration of said drill and pipe of relatively hard upper surface material, and a hoist connected to said motor unit to selectively provide gravity feed of the drill when the said releasable connector means is released to penetrate relatively softer material beneath the said surface, said motor means having a manually operable speed control whereby said pipe is selectively power fed downwardly with the drill in accordance with the feed rate of the latter during gravity feed.

5. An apparatus for drilling a relatively large bore in the earth and for installing pipe therein, comprising, a support, a pair of vertically disposed channel tracks pivoted to said support, a first motor, a pair of plates connecting said motor for vertical sliding movement on said tracks, a drill having spiral convolutions along its body, means rotatably attaching said drill to said motor, a frame supporting said motor and extending upwardly therefrom, a second motor, a hoist secured to said frame and selectively actuatable by said second motor to permit gravity feed of the drill in relatively soft earth, control valve means connected with said second motor to apply a braking force to the drill during gravity feed, a pair of vertically disposed channel members disposed between and slightly forwardly of said tracks, a feed screw mounted between said channel members, a saddle threadably secured to said feed screw and supported for sliding movement on said channel members, clamp means on said saddle for holding the upper end of a pipe in enveloping relation with said drill, adjustment means on said plates for lateral adjustment of said first motor relative to said saddle to maintain said drill and pipe in alignment, a third motor mounted on said channel members and connected to said feed screw to rotate the latter, speed control means for said third motor, and a pair of power transfer members secured to said plates and selectively connectable to said saddle so that upon actuation of said feed screw by said third motor said drill and pipe will be fed downwardly as a unit under motive power to penetrate the drill through relatively hard material.

References Cited in the file of this patent

UNITED STATES PATENTS

| 44,751 | Seely | Oct. 18, 1864 |
| 2,576,799 | McKinstry | Nov. 27, 1951 |
| 2,580,110 | Mabry | Dec. 25, 1951 |
| 2,728,555 | Burg et al. | Dec. 27, 1955 |

FOREIGN PATENTS

| 145,776 | Australia | Mar. 17, 1952 |